(12) United States Patent
Iguchi et al.

(10) Patent No.: US 11,915,876 B2
(45) Date of Patent: Feb. 27, 2024

(54) CERAMIC ELECTRONIC DEVICE

(71) Applicant: TDK CORPORATION, Tokyo (JP)

(72) Inventors: Toshihiro Iguchi, Tokyo (JP); Norihisa Ando, Tokyo (JP); Kenya Tamaki, Tokyo (JP); Hisashi Kobayashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 22 days.

(21) Appl. No.: 17/858,761

(22) Filed: Jul. 6, 2022

(65) Prior Publication Data
US 2023/0034900 A1    Feb. 2, 2023

(30) Foreign Application Priority Data

Jul. 15, 2021 (JP) .................. 2021-117259

(51) Int. Cl.
*H01G 4/232* (2006.01)
*H01G 4/30* (2006.01)
*H01G 4/12* (2006.01)

(52) U.S. Cl.
CPC ......... *H01G 4/2325* (2013.01); *H01G 4/1227* (2013.01); *H01G 4/30* (2013.01)

(58) Field of Classification Search
None
See application file for complete search history.

(56) References Cited

U.S. PATENT DOCUMENTS

| | | | | |
|---|---|---|---|---|
| 6,478,882 B2 * | 11/2002 | Miyazaki | ............ | H01G 4/0085 361/313 |
| 11,302,480 B2 * | 4/2022 | Takahashi | ............ | H01G 4/2325 |
| 11,735,366 B2 * | 8/2023 | Ikebe | ............ | H01G 4/0085 361/301.4 |
| 2017/0032896 A1 * | 2/2017 | Otani | ............ | H01G 4/30 |
| 2019/0098761 A1 * | 3/2019 | Yoshida | ............ | H01C 7/008 |
| 2021/0027945 A1 * | 1/2021 | Takahashi | ............ | H01G 4/2325 |
| 2021/0366654 A1 * | 11/2021 | Iguchi | ............ | H01G 4/1218 |
| 2022/0293343 A1 * | 9/2022 | Iguchi | ............ | H01G 4/2325 |
| 2023/0034900 A1 * | 2/2023 | Iguchi | ............ | H01G 4/1227 |

FOREIGN PATENT DOCUMENTS

JP       H04-171912 A     6/1992

* cited by examiner

*Primary Examiner* — Dion R. Ferguson
(74) *Attorney, Agent, or Firm* — Oliff PLC

(57) ABSTRACT

A ceramic electronic device comprises an element body including a ceramic layer and an internal electrode layer, and an external electrode electrically connected to at least one end of the internal electrode layer. The element body includes an interface part at least at a part of a boundary between the external electrode and the ceramic layer. The interface part includes an oxide containing aluminium and an oxide containing boron.

19 Claims, 2 Drawing Sheets

CERAMIC ELECTRONIC DEVICE

BACKGROUND OF THE INVENTION

The present invention relates to a ceramic electronic device including an external electrode.

As shown in Patent Literature 1, a ceramic electronic device including an element body containing a ceramic component and an external electrode formed on an outer surface of the element body is known. A baked electrode is widely used as the external electrode for the ceramic electronic device. The baked electrode can be formed by applying a conductive paste containing conductor powder and glass frit to the surface of the element body and baking the paste.

Unfortunately, in the conventional technique as shown in Patent Literature 1, it is difficult to bond an external electrode containing an element (e.g., copper) having low ionization tendency as a conductor to the element body or glass frit, which is an oxide.

Patent Literature 1: JPH04171912 (A)

BRIEF SUMMARY OF THE INVENTION

The present invention has been achieved under such circumstances. It is an object of the present invention to provide a ceramic electronic device having high moisture resistance and high bonding strength between an external electrode and an element body.

To achieve the above object, a ceramic electronic device according to the present invention comprises:

an element body including a ceramic layer and an internal electrode layer; and an external electrode electrically connected to at least one end of the internal electrode layer; wherein the element body includes an interface part at least at a part of a boundary between the external electrode and the ceramic layer, and the interface part includes an oxide containing aluminium and an oxide containing boron.

The ceramic electronic device according to the present invention has high moisture resistance and high bonding strength between the external electrode and the element body. The reason is considered to be as follows.

In the present invention, the element body includes the interface part at least at a part of the boundary between the external electrode and the ceramic layer. It is assumed that the interface part can exhibit both the effect produced by the oxide containing aluminium and the effect produced by the oxide containing boron, for having a mixing structure including the oxide containing aluminium and the oxide containing boron. Whereas the oxide containing boron vitrifies under a wide range of conditions, the oxide containing aluminium is difficult to vitrify.

That is, it is assumed that the oxide containing boron is vitrified at the interface part. Because the interface part can flow at a low temperature due to the action of the oxide containing boron, namely glass, it is assumed that the interface part can readily wet a conductor of the external electrode and a surface of the ceramic layer on the external electrode side. As a result, it is assumed that the external electrode and the element body are readily and firmly bonded.

Further, it is assumed that the interface part can have improved strength due to the action of the oxide containing aluminium.

Consequently, it is assumed that the moisture resistance of the ceramic electronic device and the bonding strength between the external electrode and the element body can be high, because the inclusion of the interface part enables the external electrode and the element body to bond firmly in the present invention.

The moisture resistance may be determined using, for example, the number of failures after a pressure cooker bias test (PCBT). That is, the smaller the number of failures after the PCBT is, the higher the moisture resistance is considered.

The bonding strength may be determined using, for example, the number of failures after a thermal shock test. That is, the smaller the number of failures after the thermal shock test is, the higher the bonding strength is considered.

The external electrode may include the oxide containing boron. As described above, the oxide containing boron readily vitrifies. It is thus assumed that the oxide containing boron in the external electrode is present as glass when the external electrode is baked. Consequently, it is assumed that the vitrified oxide containing boron in the external electrode flows toward the interface part when the external electrode is baked, and thus the interface part readily has the mixing structure of the oxide containing aluminium and the oxide containing boron (glass).

Preferably, the external electrode may include at least one selected from the group consisting of copper, a copper alloy, silver, and a silver alloy.

According to the present invention, even if the conductor of the external electrode includes an element (e.g., copper) that is difficult to oxidize, the moisture resistance and the bonding strength can be high, because the interface part enables the external electrode and the ceramic layer to bond firmly.

Preferably, the amount of boron atoms in the interface part may be 0.3 to 0.8 part by mol provided that the total amount of boron atoms and aluminium atoms in the interface part is 1 part by mol.

In the following explanation, the amount (part by mol) of boron atoms in the interface part provided that the total amount of boron atoms and aluminium atoms in the interface part is 1 part by mol is represented by $B/(B+Al)$. The moisture resistance can be higher when $B/(B+Al)$ is 0.3 to 0.8 part by mol than when $B/(B+Al)$ is less than 0.3 part by mol. On the other hand, the bonding strength can be higher when $B/(B+Al)$ is 0.3 to 0.8 part by mol than when $B/(B+Al)$ exceeds 0.8 part by mol.

The oxide containing aluminium may further include silicon.

Preferably, the amount of aluminium atoms in the interface part may be 0.3 part by mol or more provided that the total amount of aluminium atoms and silicon atoms in the interface part is 1 part by mol.

This can further improve the bonding strength between the external electrode and the element body. In a later explanation, the amount (part by mol) of aluminium atoms in the interface part provided that the total amount of aluminium atoms and silicon atoms in the interface part is 1 part by mol is represented by $Al/(Al+Si)$.

Preferably, the oxide containing aluminium may further include barium.

This can further improve the bonding strength between the external electrode and the element body. Accordingly, the amount of barium atoms in the interface part may be preferably 0.3 part by mol or more provided that the total amount of aluminium atoms and silicon atoms in the interface part is 1 part by mol. In a later explanation, the amount (part by mol) of barium atoms in the interface part provided that the total amount of aluminium atoms and silicon atoms in the interface part is 1 part by mol is represented by Ba/(Al+Si).

Preferably, the ratio of EB to IB (EB/IB) may satisfy 1<(EB/IB), provided that the atom ratio of boron atoms in the external electrode to the total amount of elements other than oxygen in the external electrode is defined as EB, and the atom ratio of boron atoms in the interface part to the total amount of elements other than oxygen in the interface part is defined as IB.

Satisfying 1<(EB/IB) enables the ratio of boron atoms in the interface part to stay within an appropriate range, thus enabling the bonding strength to be further improved.

Preferably, the interface part may include a protrusion protruding toward the external electrode side.

This enables the external electrode and the interface part to bond readily. Consequently, the external electrode and the element body can bond firmly, thus enabling the moisture resistance as well as the bonding strength to be further improved.

The ceramic layer may include a perovskite-type compound represented by $AMO_3$ as a main component.

The perovskite-type compound represented by $AMO_3$ may be represented by $(Ba_{1-a-b}Sr_aCa_b)_m(Ti_{1-c-d}Zr_cHf_d)O_3$ and may satisfy $0.94<m<1.1$, $0≤a≤1$, $0≤b≤1$, $0≤c≤1$, and $0≤d≤1$. In that case, an A-site element is one or a combination of two or more selected from the group mainly consisting of Ba, Sr, and Ca, and an M-site element is one or a combination of two or more selected from the group mainly consisting of Ti, Zr, and Hf.

BRIEF DESCRIPTION OF THE DRAWING(S)

DETAILED DESCRIPTION OF THE INVENTION

First Embodiment

Figure 1:
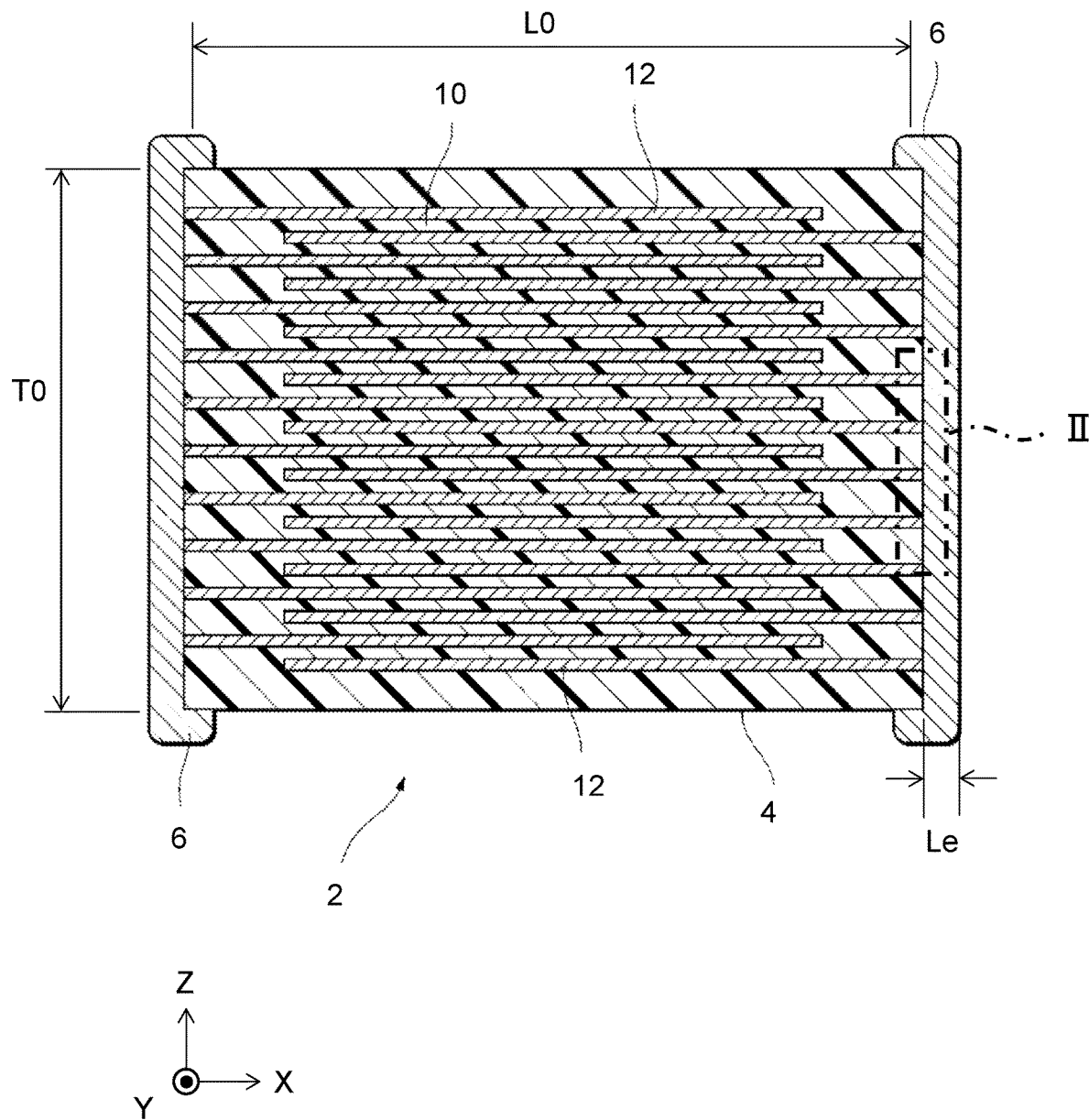
FIG. 1 is a schematic cross-sectional view of a multilayer ceramic capacitor according to an embodiment of the present invention.

As an embodiment of a ceramic electronic device according to the present invention, an overall configuration of a multilayer ceramic capacitor is explained. FIG. 1 is a cross-sectional view of a typical multilayer ceramic capacitor 2.

The multilayer ceramic capacitor 2 includes dielectric layers (ceramic layers) 10 and internal electrode layers 12 substantially parallel to a plane containing the X-axis and the Y-axis and includes an element body 4 containing the dielectric layers 10 and the internal electrode layers 12 alternately laminated along the Z-axis direction (lamination direction).

"Substantially parallel" means that the dielectric layers 10 and the internal electrode layers 12 are mostly parallel but may partly be slightly nonparallel and that the dielectric layers 10 and the internal electrode layers 12 may slightly be uneven or inclined.

According to FIG. 1, the end surfaces of the element body 4 in the X-axis direction are flat. In other words, the dielectric layers 10 and the internal electrode layers 12 are laminated so as to be flush with each other. However, the end surfaces of the element body 4 in the X-axis direction may be partly non-planar. Moreover, the dielectric layers 10 and the internal electrode layers 12 may not be flush with each other. For example, the dielectric layers 10 and the internal electrode layers 12 may be laminated so that the dielectric layers 10 are partly scraped off or the internal electrode layers 12 are partly protruding.

In the present embodiment, the X-axis, the Y-axis, and the Z-axis are perpendicular to each other.

In the present embodiment, an "inner side" means the side closer to the center of the multilayer ceramic capacitor 2, whereas an "outer side" means the side farther from the center of the multilayer ceramic capacitor 2.

In the present embodiment, every other alternately-laminated internal electrode layer 12 is electrically connected to the inner side of an external electrode 6 formed on the outer side of one end of the element body 4 in the X-axis direction, and the remaining every other alternately-laminated internal electrode layer 12 is electrically connected to the inner side of an external electrode 6 formed on the outer side of the other end of the element body 4 in the X-axis direction.

In the present embodiment, the element body 4 has any shape and size. The element body 4 may have an elliptical columnar shape, a columnar shape, a prismatic shape, or the like. For example, the element body 4 may have a length L0 of 0.4 to 5.7 mm in the X-axis direction, a length W0 of 0.2 to 5.0 mm in the Y-axis direction, and a length T0 of 0.2 to 2.3 mm in the Z-axis direction.

Each of the dielectric layers 10 has any thickness. For example, each of the dielectric layers 10 sandwiched between the internal electrode layers 12 may have a thickness Td of preferably 30 m or less.

The number of the dielectric layers 10 is not limited. The number of the dielectric layers 10 may be preferably 20 or more, and more preferably 50 or more.

The material of the dielectric layers 10 is not limited. In the present embodiment, the dielectric layers 10 include a perovskite-type compound represented by $AMO_3$ as a main component.

The main component of the dielectric layers 10 is a component included in the dielectric layers 10 at 80 mass % or more.

The perovskite-type compound represented by $AMO_3$ is represented by, for example, $(Ba_{1-a-b}Sr_aCa_b)_m(Ti_{1-c-d}Zr_cHf_d)O_3$ and may satisfy $0.94<m<1.1$, $0≤a≤1$, $0≤b≤1$, $0≤c≤1$, and $0≤d≤1$.

"m" indicates an elemental ratio of the A-site to the M-site. For example, $0.94<m<1.1$ is satisfied.

"a" indicates an elemental ratio of Sr. For example, $0≤a≤1$ is satisfied. Preferably, $0≤a≤1$ may be satisfied.

"b" indicates an elemental ratio of Ca. $0≤b≤1$ is satisfied. Preferably, $0≤b≤1$ may be satisfied.

"c" indicates an elemental ratio of Zr. $0≤c≤1$ is satisfied. Preferably, $0≤c≤1$ may be satisfied.

"d" indicates an elemental ratio of Hf. $0≤d≤1$ is satisfied. Preferably, $0≤d≤1$ may be satisfied.

An elemental ratio of oxygen (O) in the above-mentioned composition formula may slightly deviate from the stoichiometric composition.

Examples of the perovskite-type compound represented by $AMO_3$ include $(Ca_{0.7}Sr_{0.3})(Ti_{0.04}Zr_{0.96})O_3$ or $BaTiO_3$.

The dielectric layers 10 according to the present embodiment may include subcomponents, such as manganese compounds, aluminium compounds, silicon compounds, magnesium compounds, chromium compounds, nickel compounds, rare-earth element compounds, lithium compounds, boron compounds, and vanadium compounds, in addition to the main component. There is no limit to the type, combination, or addition amount of the subcomponents.

The conductive material included in the internal electrode layers 12 is not limited and may be preferably nickel, a nickel-based alloy, copper, a copper-based alloy, silver, a silver-based alloy, palladium, a palladium-based alloy, or the like. Nickel, a nickel-based alloy, copper, a copper-based alloy, a silver-palladium-based alloy, or the like may include various trace components (e.g., phosphorus) at about 0.1 mass % or less. In the present embodiment, the internal electrode layers 12 may include nickel or a nickel-based alloy as a main component. When the main component is nickel or a nickel-based alloy, one or more subcomponents selected from manganese, copper, chromium, or the like may be included.

The main component of the internal electrode layers 12 is a component included in the internal electrode layers 12 at 90 mass % or more.

A commercially available electrode paste may be used to form the internal electrode layers 12. The thickness of each of the internal electrode layers 12 may be determined appropriately based on the intended use and the like. For example, each of the internal electrode layers 12 may have a thickness Te of 3.0 μm or less.

The external electrodes 6 of the present embodiment are formed on the element body 4 so as to be electrically connected to at least a part of the internal electrode layers 12.

Each of the external electrodes 6 according to the present embodiment includes at least a conductor 61. Each of the external electrodes 6 according to the present embodiment may also include an oxide containing boron as a non-conducting component 62.

The conductor 61 included in the external electrodes 6 may include any component. The component is a known conductive material, such as nickel, copper, tin, silver, palladium, gold, or an alloy thereof. In the present embodiment, the conductor 61 may include at least one selected from the group consisting of copper, a copper alloy, silver, and a silver alloy as a main component.

The main component of the conductor 61 is a component included at 90 mass % or more in the conductor 61 other than that in a coating layer including a plating, a conductive resin, or the like.

When the conductor 61 includes copper, the external electrodes 6 may include elements such as aluminium, nickel, silver, palladium, tin, zinc, phosphorus, iron, and manganese.

Each of the external electrodes 6 may have any thickness Le. The thickness is, for example, 10 to 200 μm.

Figure 2:
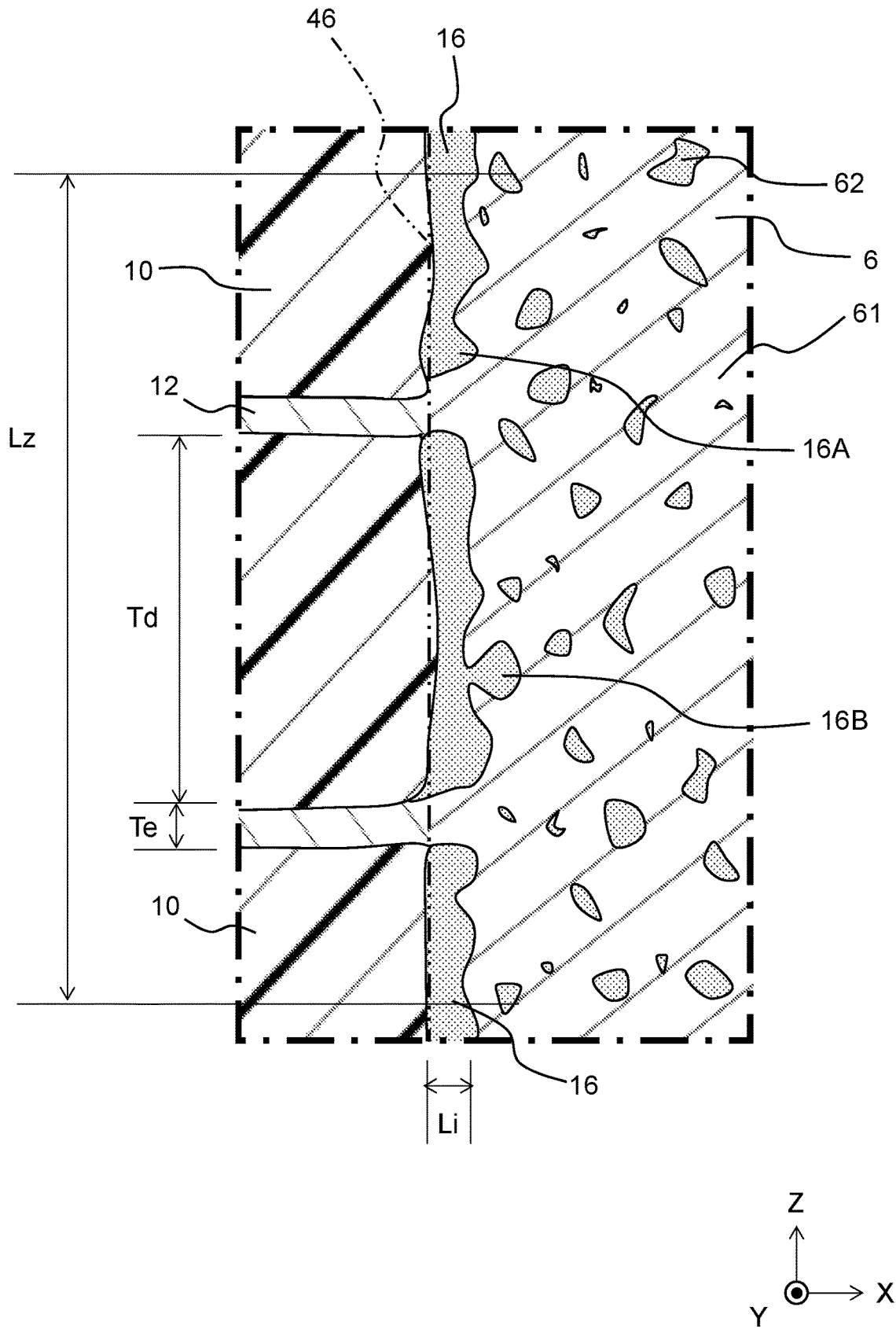
FIG. 2 is an enlarged view of an area II shown in FIG. 1.

FIG. 2 is an enlarged view of an area II shown in FIG. 1. As shown in FIG. 2, in the present embodiment, the external electrodes 6 may include the non-conducting component 62 and a void (not shown).

An example of the non-conducting component 62 is the oxide containing boron. Another example is a granule that has the same component as an interface part 16 mentioned later while not being provided at least at a part of a surface on the dielectric layer 10 side. Consequently, the non-conducting component 62 may have a composition identical to that of the interface part 16 or a composition different from that of the interface part 16.

For example, when the external electrodes 6 are baked, the oxide containing boron (the non-conducting component 62 included in the external electrodes 6) serves as a sintering aids and flows toward the interface part 16 (described later) to partly constitute the interface part 16, thus improving adhesion between the external electrodes 6 and the element body 4 and moisture resistance.

Inclusion of an oxide of aluminium, boron, silicon, barium, or the like (the non-conducting component 62) in a region of each external electrode 6 other than a boundary 46 between the external electrode 6 and the dielectric layers 10 enables the composition deviation of the interface part 16 to be prevented.

As shown in FIG. 2, in the multilayer ceramic capacitor 2 according to the present embodiment, at least a part of the boundary 46 between the external electrode 6 and the dielectric layers 10 includes the interface part 16 on the external electrode 6 side. The interface part 16 may have any shape. The interface part 16 may be layered along the boundary 46, may be amorphous, and may not necessarily cover the entire dielectric layers 10 at the vicinity of the boundary 46. For example, the interface part 16 may be formed so as to partly enter the inside of the external electrode 6, may have irregularities, or may have a protrusion protruding toward the external electrode 6 side, namely a protruding interface part 16A shown in FIG. 2.

Further, the interface part 16 according to the present embodiment may have a shape capable of exhibiting an anchoring effect. The "shape capable of exhibiting an anchoring effect" means that the interface part 16 does not spread thinly along the outer surfaces (Y-Z plane) of the dielectric layers 10 but spreads three-dimensionally from the outer surfaces of the dielectric layers 10 toward the inside of the external electrode 6 (i.e., outwards in the X-axis direction) as shown as a constricted protruding interface part 16B in FIG. 2.

Examples of the "shape capable of exhibiting an anchoring effect" are not limited. One example is a shape of the interface part 16 having a "constriction", or the constricted protruding interface part 16B shown in FIG. 2.

Note that, the interface part 16 may include a constriction in a Y-Z cross section even if the interface part 16 does not include a constriction in the X-Z cross section illustrated as FIG. 2.

The interface part 16 is intermittently disposed on each end surface of the element body 4 in the X-axis direction so that the conductor 61 and the internal electrode layers 12 are connected. That is, the interface part 16 is substantially not disposed where the ends of the internal electrode layers 12 in the X-axis direction and the conductor 61 are connected.

However, in observing the X-Z cross section, the interface part 16 may partly cover the ends of some internal electrode layers 12 in the X-axis direction in the vicinity of the end surface of the element body 4 in the X-axis direction. Since each internal electrode layer 12 exists not only along the X-axis direction but also along the Y-axis direction, if a part of an end of the internal electrode layer 12 in the Y-axis direction is not covered by the interface part 16, the internal electrode layer 12 and the conductor 61 can be electrically connected at that part. In other words, each internal electrode layer 12 and the conductor 61 can be connected electrically even if the end of the internal electrode layer 12 is partly covered by the interface part 16.

In the present embodiment, a connection interface between each of the external electrodes 6 and the internal electrode layers 12 is indicated by the boundary 46 in a straight line. However, the actual connection interface may be unclear. For example, the ends of the internal electrode layers 12 may enter the interface part 16.

When each of the external electrodes 6 is formed so as to extend from the end surface of the element body 4 in the X-axis direction to the end surfaces of the element body 4 in the Z-axis direction as shown in FIG. 1, the interface part 16 may be formed not only on the end surface in the X-axis direction but also on the end surfaces in the Z-axis direction.

An average coverage ratio of the interface part 16 at the dielectric layers 10 may be preferably 60% or more. The "average coverage ratio of the interface part 16" is calculated as an average of values (in %) worked out by dividing "a length of the interface part 16 along the boundary 46 in the predetermined length Lz" by "a length of the dielectric layers 10 along the boundary 46 in a predetermined length Lz". The predetermined length Lz is not limited. For example, the predetermined length Lz is equal to or greater than the average thickness Td of the dielectric layers 10 and is equal to or less than 100 μm.

The predetermined length Lz is a distance between two points on the boundary 46. Thus, when the interface between the element body 4 and each of the external electrodes 6 has irregularities, not the length of the irregularities but the distance between the two points determined on the boundary 46 is defined as the predetermined length Lz.

The interface part 16 may have an average thickness Li in the X-axis direction (average thickness of the interface part 16) of preferably 1.8 to 20.2 μm, more preferably 2 to 20 μm, and most preferably 3.1 to 16.2 μm.

The average thickness Li of the interface part 16 in the X-axis direction is affected by the thickness of an interface-part paste applied to the element body 4, the amount of inorganic substances in the interface-part paste, a baking temperature of the interface-part paste, a holding time of the interface-part paste at the baking temperature, or the like. The higher the baking temperature of the interface-part paste is, the greater the average thickness Li of the interface part 16 in the X-axis direction tends to be.

The interface part 16 according to the present embodiment includes an oxide containing aluminium and an oxide containing boron. The oxide containing aluminium may include silicon, barium, and the like other than aluminium. For example, a monoclinic crystal structure having a composition of $BaAl_2Si_2O_8$ may be included.

Any method may be used to include the oxide containing boron in the interface part 16 according to the present embodiment. For example, the oxide containing boron included in each of the external electrodes 6 may flow to be included in the interface part 16 during baking. Also, the interface-part paste that is to constitute the interface part 16 after baking may include a predetermined amount of boron so that the oxide containing boron is included in the interface part 16.

The interface part 16 may further include zinc, the elements constituting the dielectric layers 10, the elements constituting the internal electrode layers 12, and the elements constituting the conductor 61.

In the present embodiment, provided that the total amount of boron atoms and aluminium atoms in the interface part 16 is 1 part by mol, the amount of boron atoms in the interface part 16, namely B/(B+Al), is 0.3 to 0.8 part by mol. The moisture resistance can be higher when B/(B+Al) is 0.3 to 0.8 than when B/(B+Al) is less than 0.3. On the other hand, bonding strength can be higher when B/(B+Al) is 0.3 to 0.8 than when B/(B+Al) exceeds 0.8. More preferably, B/(B+Al) may be 0.31 to 0.78 part by mol.

In the present embodiment, provided that the total amount of aluminium atoms and silicon atoms in the interface part 16 is 1 part by mol, the amount of aluminium atoms in the interface part 16, namely Al/(Al+Si), may be preferably 0.3 part by mol or more. This can further improve bonding strength between the external electrodes 6 and the element body 4. More preferably, Al/(Al+Si) may be 0.32 to 0.66 part by mol. Because silicon serves as a sintering aids, inclusion of silicon in the interface part 16 within the above-mentioned range enables the external electrodes 6 to be readily baked at a low temperature.

In the present embodiment, provided that the total amount of aluminium atoms and silicon atoms in the interface part 16 is 1 part by mol, the amount of barium atoms in the interface part 16, namely Ba/(Al+Si), may be preferably 0.3 part by mol or more. Because barium readily substitutes for the A-site of the perovskite-type compound represented by $AMO_3$ (the main component of the dielectric layers 10), bonding strength between the interface part 16 and the dielectric layers 10 can be further improved. Consequently, the bonding strength between the external electrodes 6 and the element body 4 can be further improved. Preferably, Ba/(Al+Si) may be 0.33 to 1.38 parts by mol.

In the present embodiment, an atom ratio of boron atoms in the external electrodes 6 to the total amount of the elements other than oxygen in the external electrodes 6 is defined as "EB", whereas an atom ratio of boron atoms in the interface part 16 to the total amount of the elements other than oxygen in the interface part 16 is defined as "IB". Further, a ratio of EB to IB is defined as "EB/IB". In the present embodiment, EB/IB may be preferably larger than 1. Satisfying 1<(EB/IB) enables the ratio of boron atoms in the interface part 16 to stay within an appropriate range, thus enabling the bonding strength to be further improved. Satisfying 1.04≤(EB/IB)≤1.74 enables the ratio of boron atoms in the interface part 16 to stay within a more appropriate range, thus enabling the moisture resistance as well as the bonding strength to be further improved.

The structure of the interface part 16 may be analyzed by cross-sectional observation using a scanning electron microscope (SEM), a scanning transmission electron microscope (STEM), or the like. Specifically, when a cross section of the external electrodes 6 is observed using a backscattered electron image of SEM, a HAADF image of STEM, or the like, the conductor 61, which is often denser than the interface part 16, the non-conducting component 62, and the void, can often be recognized as having a bright contrast. On the other hand, the interface part 16, the non-conducting component 62, the void, and the like can often be recognized as having a dark contrast.

The composition of the interface part 16 may be measured by a component analysis using an electron probe microanalyzer (EPMA) in a cross-sectional observation. The component analysis may be preferably performed at least at three points, and the composition of the interface part 16 may be preferably calculated as an average of the measurement results. In the present embodiment, when the component analysis is performed using the EPMA, an energy dispersive spectrometer (EDS) or a wavelength dispersive spectrometer (WDS) may be used as an X-ray spectrometer.

Next, a method of manufacturing the multilayer ceramic capacitor 2 shown in FIG. 1 is explained.

First, a dielectric-layer paste is prepared to manufacture green sheets to be the dielectric layers 10 shown in FIG. 1 after firing.

The dielectric-layer paste normally includes an organic solvent based paste given by kneading a dielectric powder and an organic vehicle or includes a water based paste.

A raw material of the dielectric powder may be appropriately selected from various compounds to be composite oxides or oxides constituting the above-mentioned dielectric layers 10, such as carbonates, hydroxides, and organic metal compounds. Selected compounds mixed together may be used.

The organic vehicle is made of an organic solvent in which a binder is dissolved. The binder used for the organic vehicle is not limited and is appropriately selected from various normal binders, such as acrylic, ethyl cellulose, and butyral.

The organic solvent used is not limited and is appropriately selected from various organic solvents, such as alcohol, methyl ethyl ketone, acetone, toluene, terpineol, and butyl carbitol, in accordance with the method used, such as a sheet method and a printing method.

If necessary, the dielectric-layer paste may include additives selected from various dispersants, plasticizers, dielectrics, subcomponent compounds, glass frit, and the like.

Examples of the plasticizers include phthalic esters (e.g., dioctyl phthalate and benzyl butyl phthalate), adipic acid, phosphoric acid esters, and glycols.

Next, an internal-electrode-layer paste for forming the internal electrode layers 12 shown in FIG. 1 is prepared. The internal-electrode-layer paste is prepared by kneading the conductive material including the above-mentioned various conductive metals or alloys and the above-mentioned organic vehicle. Instead of the conductive material, oxides, organometallic compounds, or the like may also be used. These oxides and organometallic compounds become the above-mentioned conductive material after firing. If necessary, the internal-electrode-layer paste may include a ceramic powder (e.g., barium titanate powder and calcium strontium zirconate) as an inhibitor. The inhibitor prevents sintering of the conductive powder in the firing step.

The green sheets to be the dielectric layers 10 after firing and internal electrode pattern layers to be the internal electrode layers 12 after firing are laminated alternately as shown in FIG. 1 using the dielectric-layer paste and internal-electrode-layer paste prepared above to manufacture a green laminated body to be the element body 4 after firing.

Specifically, first, the green sheets are formed on carrier sheets (supports), such as PET films, using a doctor blade method or the like. After the green sheets are formed on the carrier sheets, the green sheets are dried.

Next, using the internal-electrode-layer paste, the internal electrode pattern layers are formed on the surfaces of the green sheets formed above to give green sheets including the internal electrode pattern layers. Then, the green sheets including the internal electrode pattern layers are alternately laminated to give the green laminated body.

The internal electrode pattern layers are formed with any method, such as a printing method and a transfer method. The green sheets including the internal electrode pattern layers may be laminated via adhesive layers.

The green laminated body is cut into a predetermined size to give a green chip. The green chip may be solidified by removing the plasticizer through solidification drying. The green chip after solidification drying may be put into a barrel together with a medium and a polishing liquid and subjected to barrel-polishing using a horizontal centrifugal barrel machine or the like. The green chip after barrel-polishing is washed with water and dried. Solidification drying and barrel polishing may not necessarily be performed.

The green chip after drying is subjected to a binder removal step, a firing step, and, if necessary, an annealing step to give the element body 4 shown in FIG. 1.

As for the binder removal conditions, the heating rate may be preferably 5 to 300° C./hour, the holding temperature may be preferably 180 to 400° C., and the temperature holding time may be preferably 0.5 to 24 hours. The binder removal atmosphere is air or a reducing atmosphere.

The holding temperature during firing may be preferably 1200 to 1350° C. and more preferably 1220 to 1300° C. The holding time may be preferably 0.5 to 8 hours and more preferably 1 to 3 hours.

Preferably, the firing atmosphere may be a reducing atmosphere. As for the ambient gas, for example, a humidified mixed gas of nitrogen and hydrogen may be used.

The oxygen partial pressure during firing is appropriately determined in accordance with the type of the conductive material in the internal-electrode-layer paste. When a base metal, such as nickel and a nickel-based alloy, is used as the conductive material, the oxygen partial pressure in the firing atmosphere may be preferably $10^{-14}$ to $10^{-10}$ MPa.

After being fired in the reducing atmosphere, the element body 4 may be preferably annealed. Annealing is a treatment for reoxidizing the dielectric layers 10. This makes it possible to remarkably extend the high-temperature load life (IR life), thus improving reliability.

The oxygen partial pressure in the annealing atmosphere may be preferably $10^{-9}$ to $10^{-5}$ MPa. An oxygen partial pressure of $10^{-9}$ MPa or more enables the dielectric layers 10 to be readily reoxidized efficiently.

Preferably, the holding temperature during annealing may be 950 to 1150° C. A holding temperature of 950° C. or higher makes it easy to sufficiently oxidize the dielectric layers 10 and to improve the insulation resistance (IR) and the IR life.

As for other annealing conditions, the temperature holding time may be preferably 0 to 20 hours, and the cooling rate may be preferably 50 to 500° C./hour. As for the ambient gas for annealing, for example, a humidified nitrogen gas or the like may be preferably used.

In the above-mentioned binder removal treatment, firing, and annealing, for example, a wetter is used to humidify the nitrogen gas, the mixed gas, and the like. In such a case, the water temperature may be preferably about 5 to 75° C.

The binder removal treatment, firing, and annealing may be performed consecutively or independently.

Next, the interface-part paste is applied on each end surface of the element body 4 in the X-axis direction, dried, and baked to form the interface part 16 on the external electrode 6 side of the boundary 46.

Except that the interface-part paste includes at least aluminium, the interface-part paste is prepared similarly to the above-mentioned internal-electrode-layer paste.

The composition of aluminium, silicon, and barium in the interface-part paste may be preferably the same as the desired composition of the oxide containing aluminium in the interface part 16. The interface-part paste may include, for example, $Al_2O_3$, $SiO_2$, $BaCO_3$, or a form of an oxide containing two or more selected from aluminium, silicon, or barium (e.g., mullite and $BaAl_2Si_2O_8$). Particularly, inclusion of the above-mentioned oxide in a particulate form in the interface-part paste enables desired irregularities and protrusions to be readily formed at the interface part 16.

The interface-part paste is applied to the element body 4 using any method, such as dipping, printing, and coating. After the interface-part paste is applied, it is dried.

Next, on the outer side of each area where the interface-part paste has been applied, the external-electrode paste is applied, dried, and baked together with the interface-part paste. Except that the external-electrode paste includes at least a metal powder constituting the conductor 61, the external-electrode paste is prepared similarly to the above-mentioned internal-electrode-layer paste. The external-electrode paste may include the non-conducting component 62 (e.g., glass frit) in addition to the metal powder.

The interface-part paste and the external-electrode paste are baked under any conditions. The pastes are baked, for example, by being held at a temperature ranging from 700 to 1000° C. for 0.1 to 3 hours in a humidified nitrogen or dried nitrogen atmosphere.

Even in this case, the conductor 61 and the internal electrode layers 12 can be electrically connected. This is because, since the internal electrode layers 12 include a metal and the dielectric layers 10 include an oxide, the oxides (e.g., $Al_2O_3$) in the interface-part paste have difficulty in wetting the internal electrode layers 12 but readily wets the dielectric layers 10. The oxide containing boron also has difficulty in wetting the internal electrode layers 12 but readily wets the dielectric layers 10. Thus, the oxides of aluminium, boron, and the like constituting the interface part 16 mostly gather near the dielectric layers 10. Consequently, it is unlikely that the oxides of aluminium, boron, and the like constituting the interface part 16 interfere with the conduction between the conductor 61 and the internal electrode layers 12.

Further, if necessary, a coating layer including a plating or the like is formed on the outer side of the baked external-electrode paste. That is, the external electrodes 6 may be formed by baking the external-electrode paste and forming the coating layer including a plating or the like.

The above-mentioned baking step for the interface-part paste and the external-electrode paste can give the interface part 16 a mixing structure of the oxide containing aluminium and the oxide containing boron.

Although the interface-part paste and the external-electrode paste are baked simultaneously in the above explanation, the external-electrode paste may be baked after the interface-part paste is baked. However, baking the interface-part paste and the external-electrode paste simultaneously readily gives the mixing structure of the oxide containing aluminium and the oxide containing boron. It is because the vitrified oxide containing boron in the external-electrode paste can flow toward the interface part 16 during baking of the interface-part paste.

The multilayer ceramic capacitor 2 manufactured in such a manner is mounted on a printed circuit board or the like by soldering or the like and is used in various electronics and the like.

The multilayer ceramic capacitor 2 according to the present embodiment has high moisture resistance and high bonding strength between the external electrodes 6 and the element body 4. The reason is considered to be as follows.

The oxide containing boron in the external electrodes 6 serves as a sintering aids. Also, the oxide containing boron readily vitrifies through formation of an irregular, three-dimensionally spread, meshed skeletal structure from a strong bonding between boron atoms and oxygen atoms. Glass flows at a low temperature and readily bonds the external electrodes 6 to the element body 4. However, glass alone has low strength and readily cracks.

In contrast, the oxide containing aluminium is more difficult to vitrify than the oxide containing boron. Whereas the boron oxide vitrifies alone, the aluminium oxide does not vitrify alone. Typically, a metal oxide including a metal atom with a large atomic radius and/or a metal oxide with an electronegativity greatly different from that of oxygen are difficult to vitrify. Compared to boron, aluminium has a larger atomic radius and a larger difference in electronegativity with that of oxygen. Consequently, the oxide containing aluminium is difficult to vitrify.

On the other hand, the oxide containing aluminium has higher strength and is difficult to crack compared to glass. However, as explained above, being difficult to vitrify, the oxide containing aluminium is difficult to flow alone at a low temperature and to firmly bond the external electrodes 6 to the element body 4, thus making it difficult to give the multilayer ceramic capacitor 2 the moisture resistance.

In the present embodiment, the element body 4 includes the interface part 16 at least at a part of the boundary 46 between each of the external electrodes 6 and the dielectric layers 10. It is assumed that the mixing structure of the oxide containing aluminium and the oxide containing boron of the interface part 16 enables the present embodiment to exhibit both the effect produced by the oxide containing aluminium and the effect produced by the oxide containing boron.

That is, it is assumed that boron is vitrified and is present as the oxide containing boron at the interface part 16. Because the interface part 16 can flow at a low temperature due to the action of the oxide containing boron, it is assumed that the interface part 16 can readily wet the conductor 61 of the external electrodes 6 and the surfaces of the dielectric layers 10 on the external electrode 6 side. As a result, it is assumed that the external electrodes 6 and the element body 4 are readily and firmly bonded.

Further, it is assumed that the interface part 16 can have improved strength due to the action of the oxide containing aluminium.

Consequently, it is assumed that the moisture resistance of the multilayer ceramic capacitor 2 and the bonding strength between the external electrodes 6 and the element body 4 can be high, because the inclusion of the interface part 16 enables the external electrodes 6 and the element body 4 to bond firmly in the present embodiment.

In the present embodiment, the external electrodes 6 may include the oxide containing boron. As explained above, the oxide containing boron readily vitrifies. It is thus assumed that the oxide containing boron is present as glass when the external electrodes 6 are baked. Consequently, it is assumed that the oxide containing boron in the external electrodes 6 vitrifies and flows toward the interface part 16 when the external electrodes 6 are baked, and thus the interface part 16 readily has the mixing structure of the oxide containing aluminium and the oxide containing boron.

Copper and the like, which are used as the conductor of the external electrodes 6, have low ionization tendency and are thus comparatively difficult to oxidize. In other words, copper is a metal that is difficult to combine with oxygen. In contrast, the ceramic component included in the dielectric layers 10 is an oxide. Moreover, the external electrodes 6 include the oxide containing boron. Consequently, it is difficult to bond the external electrodes 6 including an element (e.g., copper) with low ionization tendency as the conductor and the dielectric layers 10 (oxide) or the oxide containing boron.

According to the present embodiment, even if the conductor 61 of the external electrodes 6 includes an element (e.g., copper) that is difficult to oxidize, the moisture resistance and the bonding strength can be high, because the interface part 16 enables the external electrodes 6 and the dielectric layers 10 to bond firmly.

While an embodiment of the present invention is explained above, the present invention is not limited to the above-mentioned embodiment and can be modified variously without departing from the gist of the present invention.

For example, the ceramic electronic device of the present invention is applicable not only to a multilayer ceramic capacitor but also to other ceramic electronic devices. Other ceramic electronic devices include all electronic devices having a ceramic layer and an external electrode, such as disk-shaped capacitors, bandpass filters, multilayer three-terminal filters, piezoelectric elements, PTC thermistors, NTC thermistors, and varistors.

While the dielectric layers 10 and the internal electrode layers 12 are laminated in the Z-axis direction in the present embodiment, the lamination direction may be the X-axis direction or the Y-axis direction. In that case, the external electrodes 6 are formed in accordance with exposed surfaces of the internal electrode layers 12. Further, the element body 4 is not necessarily a laminated body and may be a single layer. Moreover, the internal electrode layers 12 may be drawn out to an outer surface of the element body 4 via through-hole electrodes. In that case, the through-hole electrodes and the external electrodes 6 are electrically connected.

EXAMPLES

Hereinafter, the present invention is explained in more detail with examples of the present invention. However, the present invention is not limited to the examples.

Experiment 1

<Sample No. 1>

A $(Ca_{0.7}Sr_{0.3})(Ti_{0.04}Zr_{0.96})O_3$ powder was prepared as a main raw material of a dielectric powder. Next, with respect to 100 parts by mol of the main raw material, 2.1 parts by mol of a $MnCO_3$ powder, 0.3 part by mol of a $Al_2O_3$ powder, and 1.6 parts by mol of a $SiO_2$ powder were weighed as subcomponents. The powders of the subcomponents were mixed in a wet manner with a ball mill, dried, and calcined to give a subcomponent calcined powder.

Next, the main raw material of the dielectric powder: 100 parts by mass, the subcomponent calcined powder given above, an acrylic resin: 7 parts by mass, butyl benzyl phthalate (BBP) as a plasticizer: 4 parts by mass, and methyl ethyl ketone as a solvent: 80 parts by mass were mixed with a ball mill and turned into a paste to give a dielectric-layer paste.

In addition, nickel particles: 56 parts by mass, terpineol: 40 parts by mass, ethyl cellulose (molecular weight: 140, 000): 4 parts by mass, and benzotriazole: 1 part by mass were kneaded with a triple-roll mill and turned into a paste to form an internal-electrode-layer paste.

Then, green sheets were formed on PET films using the dielectric-layer paste prepared above. The internal-electrode-layer paste was screen printed on the green sheets to give green sheets including the internal electrode pattern layers.

The green sheets were laminated and bonded with pressure to give a green laminated body. The green laminated body was cut into a predetermined size to give green chips.

Next, the given green chips were subjected to a binder removal treatment, firing, and annealing under the following conditions to give sintered bodies (element bodies 4).

As for the conditions of the binder removal treatment, the holding temperature was 260° C., and the atmosphere was air.

As for the firing conditions, the holding temperature was 1250° C. The ambient gas was a humidified mixed gas of nitrogen and oxygen, and the oxygen partial pressure was set to $10^{-9}$ MPa or less.

As for the annealing conditions, the holding temperature was 1050° C., and the ambient gas was a humidified nitrogen gas (oxygen partial pressure: $10^{-8}$ MPa or less).

To humidify the ambient gases used in firing and annealing, a wetter was used.

Next, an interface-part paste including $BaCO_3$, $Al_2O_3$, and $SiO_2$ was prepared.

The interface-part paste was applied to both end surfaces of each element body 4 in the X-axis direction with a dipping method and dried, then an external-electrode paste was applied thereto, dried, and baked at 800° C. The external-electrode paste included copper as a conductor 61 (metal powder) and an oxide containing boron as a nonconducting component 62.

A capacitor sample 2 (multilayer ceramic capacitor 2) including external electrodes 6 was given in such a manner.

The size of the element body 4 of the given capacitor sample 2 was L0×W0×T0=5.7 mm×5.0 mm×2.0 mm. The number of dielectric layers 10 sandwiched between internal electrode layers 12 was 80.

The given capacitor sample 2 was cut in parallel to the X-Z plane. The cross section was mirror polished and then photographed using a SEM. In the cross section of the capacitor sample 2, it was confirmed that an interface part 16 included a protrusion protruding toward the external electrode 6 side. An elemental analysis of the interface part 16 in the cross section of the capacitor sample 2 was carried out using an EPMA. From the analysis results, it was confirmed that the elemental composition of barium, aluminium, and silicon in the interface-part paste and the elemental composition of the interface part 16 were substantially the same. It was also confirmed that the interface part 16 included boron and oxygen.

Also, the average thickness Td of the dielectric layers 10 sandwiched between the internal electrode layers 12, the average thickness Te of the internal electrode layers 12, the average thickness Li of the interface part 16, the average thickness Le of the external electrodes 6, and the average coverage ratio of the interface part 16 were measured. Measurements were performed at 10 points to calculate the respective averages. The results were as follows.

Average thickness Td of the dielectric layers 10 sandwiched between the internal electrode layers 12: 18 μm Average thickness Te of the internal electrode layers 12: 1.5 μm Average thickness Li of the interface part 16: 1.9 μm Average thickness Le of the external electrodes 6: 89 μm Average coverage ratio of the interface part 16: 82%

A 100-hour pressure cooker bias test (PCBT) and a 100-cycle thermal shock test were performed for the capacitor sample 2 using the following methods.

100-Hour PCBT

The capacitor sample 2 was mounted on an FR4 substrate (a glass epoxy substrate) using Sn—Ag—Cu solder, put into a pressure cooker tank, and subjected to an accelerated moisture resistance load test where a voltage of 630 V was applied to each capacitor sample 2 for 100 hours at a temperature of 121° C. and a humidity of 95%. Eighty capacitor samples 2 were subjected to the test. Table 1 shows the number of failed capacitor samples 2.

100-Cycle Thermal Shock Test

The capacitor sample 2 was held in an air tank at −55° C. for 30 minutes and then at 125° C. for 30 minutes, and this cycle was repeated for 100 times. The test was performed with the capacitor sample 2 mounted on a circuit board. Eighty capacitor samples 2 were subjected to the test. Table 1 shows the number of failed capacitor samples 2.

<Sample No. 2>

In Sample No. 2, the main raw material of the dielectric powder was changed from the $(Ca_{0.7}Sr_{0.3})(Ti_{0.04}Zr_{0.96})O_3$ powder to a $BaTiO_3$ powder, and then 1.6 parts by mol of a $MgCO_3$ powder, 1.0 part by mol of a $Dy_2O_3$ powder, 0.4 part by mol of a $MnCO_3$ powder, 0.06 part by mol of a $V_2O_5$ powder, and 2.0 parts by mol of a $SiO_2$ powder were weighed as subcomponents with respect to 100 parts by mol of the main raw material. Except that the powders of the above subcomponents were mixed in a wet manner with a ball mill, dried, and calcined to give a subcomponent calcined powder, a capacitor sample 2 of Sample No. 2 was prepared similarly to Sample No. 1. Then, the 100-hour PCBT and the 100-cycle thermal shock test were performed. Table 1 shows the results.

The capacitor sample 2 of Sample No. 2 was cut in parallel to the X-Z plane. The cross section was mirror polished and then photographed using a SEM. An elemental analysis of the interface part 16 in the cross section of the capacitor sample 2 was carried out using an EPMA. From the analysis results, it was confirmed that the elemental composition of barium, aluminium, and silicon in the interface-part paste and the elemental composition of the interface part 16 were substantially the same. It was also confirmed that the interface part 16 included boron and oxygen.

<Sample No. 3>

Except that the interface-part paste was not applied, a capacitor sample 2 of Sample No. 3 was prepared similarly to Sample No. 1. Additionally, the 100-hour PCBT and the 100-cycle thermal shock test were performed similarly to Sample No. 1. Table 1 shows the results.

The capacitor sample 2 of Sample No. 3 was cut in parallel to the X-Z plane. The cross section was mirror polished and then photographed using a SEM. An elemental analysis of the interface part 16 in the cross section of the capacitor sample 2 was carried out using an EPMA. From the analysis results, it was confirmed that the interface part 16 included boron and oxygen. Similarly, an elemental analysis of barium, aluminium, and silicon in the interface part 16 was carried out. Each of the amounts of barium, aluminium, and silicon was less than 0.05 part by mol with respect to 1 part by mol of boron atoms in the interface part 16. Consequently, barium, aluminium, and silicon were considered to be substantially not included in Sample No. 3.

<Sample No. 4>

Except that the external-electrode paste did not include the oxide containing boron, a capacitor sample 2 of Sample No. 4 was prepared similarly to Sample No. 1. Then, the 100-hour PCBT and the 100-cycle thermal shock test were performed. Table 1 shows the results.

The capacitor sample 2 of Sample No. 4 was cut in parallel to the X-Z plane. The cross section was mirror polished and then photographed using a SEM. An elemental analysis of the interface part 16 in the cross section of the capacitor sample 2 was carried out using an EPMA. From the analysis results, it was confirmed that the elemental composition of barium, aluminium, and silicon in the interface-part paste and the elemental composition of the interface part 16 were substantially the same. It was also confirmed that the interface part 16 included oxygen. Further, an elemental analysis of boron in the interface part 16 was carried out similarly. The amount of boron atoms was less than 0.05 part by mol with respect to 1 part by mol of aluminium atoms in the interface part 16. Consequently, boron was considered to be substantially not included in Sample No. 4.

TABLE 1

| Sample No. | Composition of main component of dielectric layers | Main component of external electrodes | Component of interface part | Failures after 100-hour PCBT | Failures after 100-cycle thermal shock test |
|---|---|---|---|---|---|
| 3 | CSTZ | Cu | Oxide containing B | 0/80 | 2/80 |
| 4 | CSTZ | Cu | Oxide containing Al Oxide containing Si | 2/80 | 0/80 |
| 1 | CSTZ | Cu | Oxide containing B Oxide containing Al | 0/80 | 0/80 |
| 2 | BT | Cu | Oxide containing B Oxide containing Al | 0/80 | 0/80 |

According to Table 1, the number of failures after the 100-cycle thermal shock test was smaller when the interface part 16 included the oxide containing aluminium and the oxide containing boron (Sample Nos. 1 and 2) than when the interface part 16 included the oxide containing boron and excluded the oxide containing aluminium (Sample No. 3). It was thus confirmed that the bonding strength of each of Sample Nos. 1 and 2 was higher than that of Sample No. 3. It was assumed that the bonding strength was higher in each of Sample Nos. 1 and 2 because the interface part 16 included the oxide containing aluminium.

According to Table 1, the number of failures after the 100-hour PCBT was smaller when the interface part 16 included the oxide containing aluminium and the oxide containing boron (Sample Nos. 1 and 2) than when the interface part 16 included the oxide containing aluminium and excluded the oxide containing boron (Sample No. 4). It was thus confirmed that the moisture resistance of each of Sample Nos. 1 and 2 was higher than that of Sample No. 4. In Sample Nos. 1 and 2, it was assumed that the moisture resistance was higher because the interface part 16 flowed and improved the adhesion between the external electrodes 6 and the element body 4, for the interface part 16 included the oxide containing boron.

Experiment 2

<Sample No. 1>

Through an elemental analysis of the interface part 16 of Sample No. 1 using an EPMA, the value of B/(B+Al) in the interface part 16 was calculated. Table 2 shows the results. Additionally, a 240-hour pressure cooker bias test (PCBT) and a 240-cycle thermal shock test were performed using the following methods.

240-Hour PCBT

The capacitor sample 2 was mounted on an FR4 substrate (a glass epoxy substrate) using Sn—Ag—Cu solder, put into a pressure cooker tank, and subjected to an accelerated moisture resistance load test where a voltage of 630 V was applied to each capacitor sample 2 for 240 hours at a temperature of 121° C. and a humidity of 95%. Eighty capacitor samples 2 were subjected to the test. Table 2 shows the number of failed capacitor samples.

240-Cycle Thermal Shock Test

The capacitor sample 2 was held in an air tank at −55° C. for 30 minutes and then at 125° C. for 30 minutes, and this cycle was repeated for 240 times. The test was performed with the capacitor sample 2 mounted on a circuit board. Eighty capacitor samples 2 were subjected to the test. Table 2 shows the number of failed capacitor samples 2.

<Sample Nos. 11 to 14>

Except that the amount of the oxide containing boron in the external-electrode paste was changed, a capacitor sample 2 of each of Sample Nos. 11 to 14 was prepared similarly to Sample No. 1. The value of B/(B+Al) in the interface part 16 was calculated, and the 100-hour PCBT, the 240-hour PCBT, the 100-cycle thermal shock test, and the 240-cycle thermal shock test were performed. Table 2 shows the results.

TABLE 2

| Sample No. | Composition of main component of dielectric layers | Main component of external electrodes | B/(B + Al) in interface part | Failures after 100-hour PCBT | Failures after 240-hour PCBT | Failures after 100-cycle thermal shock test | Failures after 240-cycle thermal shock test |
|---|---|---|---|---|---|---|---|
| 11 | CSTZ | Cu | 0.24 | 0/80 | 2/80 | 0/80 | 0/80 |
| 12 | CSTZ | Cu | 0.31 | 0/80 | 0/80 | 0/80 | 0/80 |
| 1  | CSTZ | Cu | 0.63 | 0/80 | 0/80 | 0/80 | 0/80 |
| 13 | CSTZ | Cu | 0.78 | 0/80 | 0/80 | 0/80 | 0/80 |
| 14 | CSTZ | Cu | 0.86 | 0/80 | 0/80 | 0/80 | 1/80 |

According to Table 2, the number of failures after the 240-hour PCBT was smaller when the value of B/(B+Al) was 0.3 to 0.8 (Sample Nos. 1, 12, and 13) than when the value of B/(B+Al) was 0.24 (Sample No. 11). It was thus confirmed that the moisture resistance of each of Sample Nos. 1, 12, and 13 was higher than that of Sample No. 11. In Sample Nos. 1, 12, and 13, it was assumed that the moisture resistance was higher because the interface part 16 more readily flowed and further improved the adhesion between the external electrodes 6 and the element body 4, for the interface part 16 included a large enough amount of boron.

According to Table 2, the number of failures after the 240-cycle thermal shock test was smaller when the value of B/(B+Al) in the interface part was 0.3 to 0.8 (Sample Nos. 1, 12, and 13) than when the value of B/(B+Al) was 0.86 (Sample No. 14). It was thus confirmed that the bonding strength of each of Sample Nos. 1, 12, and 13 was higher than that of Sample No. 14. In Sample Nos. 1, 12, and 13, it was assumed that the bonding strength was higher because the interface part 16 included a large enough amount of aluminium.

Experiment 3

<Sample No. 1>

Through an elemental analysis of the interface part 16 of Sample No. 1 using an EPMA, the value of Al/(Al+Si) in the interface part 16 was calculated. Table 3 shows the results.

<Sample Nos. 21 and 22>

Except that the amounts of Al$_2$O$_3$ and SiO$_2$ in the interface-part paste were changed, a capacitor sample 2 of each of Sample Nos. 21 and 22 was prepared similarly to Sample No. 1. The value of Al/(Al+Si) in the interface part 16 was calculated, and the 100-cycle thermal shock test and the 240-cycle thermal shock test were performed. Table 3 shows the results.

TABLE 3

| Sample No. | Composition of main component of dielectric layers | Main component of external electrodes | Al/(Al + Si) in interface part | Failures after 100-cycle thermal shock test | Failures after 240-cycle thermal shock test |
|---|---|---|---|---|---|
| 21 | CSTZ | Cu | 0.24 | 0/80 | 1/80 |
| 1  | CSTZ | Cu | 0.32 | 0/80 | 0/80 |
| 22 | CSTZ | Cu | 0.66 | 0/80 | 0/80 |

According to Table 3, the number of failures after the 240-cycle thermal shock test was smaller when the value of Al/(Al+Si) in the interface part was 0.3 or more (Sample Nos. 1 and 22) than when the value of Al/(Al+Si) was 0.24 (Sample No. 21). It was thus confirmed that the bonding strength of each of Sample Nos. 1 and 22 was higher than that of Sample No. 21. In Sample Nos. 1 and 22, it was assumed that the bonding strength was higher because the interface part 16 included a large enough amount of aluminium.

Experiment 4

<Sample No. 1>

As for Sample No. 1 mentioned above, a 500-cycle thermal shock test was performed using the following method.

500-Cycle Thermal Shock Test

The capacitor sample 2 was held in an air tank at −55° C. for 30 minutes and then at 125° C. for 30 minutes, and this cycle was repeated for 500 times. The test was performed with the capacitor sample 2 mounted on a circuit board. Eighty capacitor samples 2 were subjected to the test. Table 4 shows the number of failed capacitor samples 2.

<Sample No. 31>

Except that the interface-part paste did not include $BaCO_3$, a capacitor sample 2 of Sample No. 31 was prepared similarly to Sample No. 1. Then, the 100-cycle thermal shock test, the 240-cycle thermal shock test, and the 500-cycle thermal shock test were performed.

TABLE 4

| Sample No. | Composition of main component of dielectric layers | Main component of external electrodes | Oxide containing Al in interface part | Failures after 100-cycle thermal shock test | Failures after 240-cycle thermal shock test | Failures after 500-cycle thermal shock test |
|---|---|---|---|---|---|---|
| 31 | CSTZ | Cu | Al—Si—O | 0/80 | 0/80 | 1/80 |
| 1 | CSTZ | Cu | Ba—Al—Si—O | 0/80 | 0/80 | 0/80 |

According to Table 4, the number of failures after the 500-cycle thermal shock test was smaller when the oxide containing aluminium in the interface part 16 was Ba—Al—Si—O (Sample No. 1) than when the oxide containing aluminium in the interface part 16 was Al—Si—O (Sample No. 31). It was thus confirmed that the bonding strength of Sample No. 1 was higher than that of Sample No. 31.

Experiment 5

<Sample No. 1>

Through an elemental analysis of the interface part 16 of Sample No. 1 using an EPMA, the value of Ba/(Al+Si) in the interface part 16 was calculated. Table 5 shows the results.

<Sample Nos. 41 and 42>

Except that the amounts of $BaCO_3$, $Al_2O_3$, and $SiO_2$ in the interface-part paste were changed, a capacitor sample 2 of each of Sample Nos. 41 and 42 was prepared similarly to Sample No. 1. The value of Ba/(Al+Si) in the interface part 16 was calculated, and the 100-cycle thermal shock test, the 240-cycle thermal shock test, and the 500-cycle thermal shock test were performed. Table 5 shows the results.

TABLE 5

| Sample No. | Composition of main component of dielectric layers | Main component of external electrodes | Ba/(Al + Si) in interface part | Failures after 100-cycle thermal shock test | Failures after 240-cycle thermal shock test | Failures after 500-cycle thermal shock test |
|---|---|---|---|---|---|---|
| 41 | CSTZ | Cu | 0.27 | 0/80 | 0/80 | 1/80 |
| 1 | CSTZ | Cu | 0.33 | 0/80 | 0/80 | 0/80 |
| 42 | CSTZ | Cu | 1.38 | 0/80 | 0/80 | 0/80 |

According to Table 5, the number of failures after the 500-cycle thermal shock test was smaller when the value of Ba/(Al+Si) in the interface part 16 was 0.3 or more (Sample Nos. 1 and 42) than when the value of Ba/(Al+Si) was 0.27 (Sample No. 41). It was thus confirmed that the bonding strength of each of Sample Nos. 1 and 42 was higher than that of Sample No. 41.

Experiment 6

<Sample No. 1>

Through an elemental analysis of the external electrodes 6 and the interface part 16 of Sample No. 1 using an EPMA, the value of EB/IB was calculated. Table 6 shows the results. Additionally, a 500-hour pressure cooker bias test (PCBT) was performed using the following method.

500-Hour PCBT

The capacitor sample 2 was mounted on an FR4 substrate (a glass epoxy substrate) using Sn—Ag—Cu solder, put into a pressure cooker tank, and subjected to an accelerated moisture resistance load test at a temperature of 121° C. and a humidity of 95% for 500 hours. Eighty capacitor samples 2 were subjected to the test. Table 6 shows the number of failed capacitor samples 2.

<Sample No. 51>

Except that the amount of the oxide containing boron in the external-electrode paste was increased, a capacitor sample 2 of Sample No. 51 was prepared similarly to Sample No. 1. The value of EB/IB was calculated, and the 100-hour PCBT, the 240-hour PCBT, the 500-hour PCBT, the 100-cycle thermal shock test, the 240-cycle thermal shock test, and the 500-cycle thermal shock test were performed. Table 6 shows the results.

<Sample Nos. 52 and 53>

Except that the interface-part paste further included the oxide containing boron, a capacitor sample 2 of each of Sample Nos. 52 and 53 was prepared similarly to Sample No. 1. Then, the 100-hour PCBT, the 240-hour PCBT, the 500-hour PCBT, the 100-cycle thermal shock test, the 240-cycle thermal shock test, and the 500-cycle thermal shock test were performed. Table 6 shows the results.

According to Table 6, the number of failures after the 500-cycle thermal shock test was smaller when the value of EB/IB exceeded 1 (Sample Nos. 51, 1, and 52) than when the value of EB/IB was 1 (Sample No. 53). It was thus confirmed that the bonding strength of each of Sample Nos. 51, 1, and 52 was higher than that of Sample No. 53.

According to Table 6, the number of failures after the 500-hour PCBT was smaller when the value of EB/IB was 1.74 or less (Sample Nos. 1 and 52) than when the value of EB/IB was 1.80 (Sample No. 51). It was thus confirmed that the moisture resistance of each of Sample Nos. 1 and 52 was higher than that of Sample No. 51.

DESCRIPTION OF THE REFERENCE NUMERALS

2 . . . multilayer ceramic capacitor (capacitor sample)
4 . . . element body
6 . . . external electrode
61 . . . conductor
62 . . . non-conducting component
10 . . . dielectric layer (ceramic layer)
12 . . . internal electrode layer
16 . . . interface part
16A . . . protruding interface part
16B . . . constricted protruding interface part
46 . . . boundary

What is claimed is:

1. A ceramic electronic device comprising:
an element body including a ceramic layer and an internal electrode layer; and
an external electrode electrically connected to at least one end of the internal electrode layer; wherein
the element body includes an interface part at least at a part of a boundary between the external electrode and the ceramic layer,
the interface part includes an oxide containing aluminium and an oxide containing boron,
the oxide containing aluminium further includes silicon, and

TABLE 6

| Sample No. | Composition of main component of dielectric layers | Main component of external electrodes | EB/IB | Failures after 100-hour PCBT | Failures after 240-hour PCBT | Failures after 500-hour PCBT | Failures after 100-cycle thermal shock test | Failures after 240-cycle thermal shock test | Failures after 500-cycle thermal shock test |
|---|---|---|---|---|---|---|---|---|---|
| 51 | CSTZ | Cu | 1.80 | 0/80 | 0/80 | 2/80 | 0/80 | 0/80 | 0/80 |
| 1 | CSTZ | Cu | 1.74 | 0/80 | 0/80 | 0/80 | 0/80 | 0/80 | 0/80 |
| 52 | CSTZ | Cu | 1.04 | 0/80 | 0/80 | 0/80 | 0/80 | 0/80 | 0/80 |
| 53 | CSTZ | Cu | 1 | 0/80 | 0/80 | 0/80 | 0/80 | 0/80 | 3/80 | an amount of aluminium atoms in the interface part is 0.3 part by mol or more provided that a total amount of aluminium atoms and silicon atoms in the interface part is 1 part by mol.

2. The ceramic electronic device according to claim 1, wherein the external electrode includes at least one selected from the group consisting of copper, a copper alloy, silver, and a silver alloy.

3. The ceramic electronic device according to claim 1, wherein an amount of boron atoms in the interface part is 0.3 to 0.8 part by mol provided that a total amount of boron atoms and aluminium atoms in the interface part is 1 part by mol.

4. The ceramic electronic device according to claim 1, wherein the oxide containing aluminium further includes barium.

5. The ceramic electronic device according to claim 4, wherein an amount of barium atoms in the interface part is 0.3 to 1.4 parts by mol provided that a total amount of aluminium atoms and silicon atoms in the interface part is 1 part by mol.

6. The ceramic electronic device according to claim 1, wherein a ratio of EB to IB (EB/IB) satisfies 1<(EB/IB),
provided that an atom ratio of boron atoms in the external electrode to a total amount of elements other than oxygen in the external electrode is defined as EB, and
an atom ratio of boron atoms in the interface part to a total amount of elements other than oxygen in the interface part is defined as IB.

7. The ceramic electronic device according to claim 1, wherein the interface part includes a protrusion protruding toward the external electrode side.

8. The ceramic electronic device according to claim 1, wherein the ceramic layer includes a perovskite-type compound represented by $AMO_3$ as a main component.

9. The ceramic electronic device according to claim 8, wherein the perovskite-type compound represented by $AMO_3$ is represented by $(Ba_{1-a-b}Sr_aCa_b)_m(Ti_{1-c-d}Zr_cHf_d)O_3$ and satisfies $0.94<m<1.1$, $0\leq a\leq 1$, $0\leq b\leq 1$, $0\leq c\leq 1$, and $0\leq d\leq 1$.

10. A ceramic electronic device comprising:
an element body including a ceramic layer and an internal electrode layer; and
an external electrode electrically connected to at least one end of the internal electrode layer; wherein
the element body includes an interface part at least at a part of a boundary between the external electrode and the ceramic layer,
the interface part includes an oxide containing aluminium and an oxide containing boron,
a ratio of EB to IB (EB/IB) satisfies 1<(EB/IB),
provided that an atom ratio of boron atoms in the external electrode to a total amount of elements other than oxygen in the external electrode is defined as EB, and
an atom ratio of boron atoms in the interface part to a total amount of elements other than oxygen in the interface part is defined as IB.

11. The ceramic electronic device according to claim 10, wherein the external electrode includes at least one selected from the group consisting of copper, a copper alloy, silver, and a silver alloy.

12. The ceramic electronic device according to claim 10, wherein
an amount of boron atoms in the interface part is 0.3 to 0.8 part by mol provided that a total amount of boron atoms and aluminium atoms in the interface part is 1 part by mol.

13. The ceramic electronic device according to claim 10, wherein the oxide containing aluminium further includes silicon.

14. The ceramic electronic device according to claim 13, wherein an amount of aluminium atoms in the interface part is 0.3 part by mol or more provided that a total amount of aluminium atoms and silicon atoms in the interface part is 1 part by mol.

15. The ceramic electronic device according to claim 10, wherein the oxide containing aluminium further includes barium.

16. The ceramic electronic device according to claim 15, wherein an amount of barium atoms in the interface part is 0.3 to 1.4 parts by mol provided that a total amount of aluminium atoms and silicon atoms in the interface part is 1 part by mol.

17. The ceramic electronic device according to claim 10, wherein the interface part includes a protrusion protruding toward the external electrode side.

18. The ceramic electronic device according to claim 1, wherein the ceramic layer includes a perovskite-type compound represented by $AMO_3$ as a main component.

19. The ceramic electronic device according to claim 18, wherein the perovskite-type compound represented by $AMO_3$ is represented by $(Ba_{1-a-b}Sr_aCa_b)_m(Ti_{1-c-d}Zr_cHf_d)O_3$ and satisfies $0.94<m<1.1$, $0\leq a\leq 1$, $0\leq b\leq 1$, $0\leq c\leq 1$, and $0\leq d\leq 1$.

* * * * *